United States Patent
Siaud et al.

(10) Patent No.: US 8,050,340 B2
(45) Date of Patent: Nov. 1, 2011

(54) METHOD AND A DEVICE FOR DYNAMICALLY SELECTING ORTHOGONAL FUNCTIONS OF AN ORTHOGONAL TRANSMISSION SYSTEM

(75) Inventors: Isabelle Siaud, Rennes (FR); Anne-Marie Ulmer-Moll, Rennes (FR)

(73) Assignee: France Telecom, Paris (FR)

( * ) Notice: Subject to any disclaimer, the term of this patent is extended or adjusted under 35 U.S.C. 154(b) by 541 days.

(21) Appl. No.: 12/087,298

(22) PCT Filed: Jan. 2, 2007

(86) PCT No.: PCT/FR2007/050601
§ 371 (c)(1),
(2), (4) Date: Jun. 30, 2008

(87) PCT Pub. No.: WO2007/077403
PCT Pub. Date: Jul. 12, 2007

(65) Prior Publication Data
US 2009/0129490 A1    May 21, 2009

(30) Foreign Application Priority Data

Dec. 30, 2005 (FR) ...................... 05 54159

(51) Int. Cl.
*H04K 1/10* (2006.01)

(52) U.S. Cl. ........ 375/260; 375/262; 375/265; 375/267; 375/295; 370/203; 370/207; 370/208; 370/206; 370/310; 714/776; 714/774; 714/780

(58) Field of Classification Search .................. 375/260, 375/262, 265, 267, 295, 340, 345; 714/776, 714/774, 780, 480; 370/203, 207, 208, 206, 370/310
See application file for complete search history.

(56) References Cited

U.S. PATENT DOCUMENTS

| | | | |
|---|---|---|---|
| 6,704,366 B1 * | 3/2004 | Combes et al. ............... | 375/260 |
| 7,210,075 B2 * | 4/2007 | Ferrari et al. ................. | 714/701 |
| 7,386,072 B2 * | 6/2008 | Uno ............................... | 375/344 |
| 2004/0178934 A1 | 9/2004 | Balakrishnan et al. | |

FOREIGN PATENT DOCUMENTS

FR         2 854 020      10/2004
WO     WO 2007/066044   6/2007

OTHER PUBLICATIONS

Document ETSI 300 401, "Radio broadcasting systems: digital audio broadcasting (DAB) to mobile, portable, and fixed receivers", p. 182, May 1997.
Multiband OFDM Alliance SIG, Multiband OFDM Physical Layer Proposal for IEEE 802.15 Task Group 3A, info@multibandofdm.org, Sep. 14, 2004.

(Continued)

*Primary Examiner* — Dac V. Ha
*Assistant Examiner* — Rahel Guarino
(74) *Attorney, Agent, or Firm* — Cozen O'Connor

(57) ABSTRACT

An interleaving method (1) and a frequency interleaver (EF) of data symbols. The data symbols are for allocation to carriers of a set of $N_{FFT}$ carriers of a module for multiplexing and modulation by orthogonal functions in a multicarrier transmitter device (EM). The method includes selecting in time-varying manner from the set of carriers, carriers that are dedicated to transmitting data symbols and in dynamically interleaving a block of carriers constituted by the selected carriers and by null carriers.

12 Claims, 3 Drawing Sheets

OTHER PUBLICATIONS

IEEE Std. 802.16/2004, IEEE Standard for Local and metropolitan area networks, Part 16: Air Interface for Fixed Broadband Wireless Access Systems, Oct. 2004.

A. Batra et al., "TI Physical Layer Proposal for IEEE 802.15 Task Group 3a", IEEE P802.15 Wireless Personal Area Networks, May 12, 2003.

* cited by examiner

METHOD AND A DEVICE FOR DYNAMICALLY SELECTING ORTHOGONAL FUNCTIONS OF AN ORTHOGONAL TRANSMISSION SYSTEM

RELATED APPLICATIONS

This is a U.S. national stage under 35 USC 371 of application Ser. No. PCT/FR2007/050601, filed on Jan. 2, 2007.

This application claims the priority of French patent application no. 05/54159 filed Dec. 30, 2005, the content of which is hereby incorporated by reference.

BACKGROUND OF THE INVENTION

The present invention relates to the field of telecommunications. Within this field, the invention relates more particularly to so-called digital communications. Digital communications include in particular wireless communications; however they also include communications by wire. The communications transmission medium is commonly referred to as a transmission or propagation channel, originally with reference to a radio channel, and by extension with reference to any channel.

The invention relates to interleaving techniques combined with a method of selecting functions from a plurality of functions used for transmitting the useful information in a transmission system where the useful information is projected on the basis of so-called orthogonal functions. Selecting one or more functions on the basis of an external criterion can be considered as an extension to a technique of obtaining diversity by selection. The diversity techniques that are usually implemented proceed from duplicating the information that is to be transmitted, followed by selecting one of the signals on reception depending on an external criterion that leads to an improvement in performance. The present method does not duplicate the information for transmission but makes a prior selection of the functions appropriate for conveying the data when the signal is decomposed on the basis of orthogonal functions of dimension greater than the dimension of the signal to be transmitted. The signal is made up of components that carry information and of components that do not carry information. In a system that is subject to a frequency selective transmission channel, selection consists in not using functions that are very noisy for conveying data. The method leads to a reduction in noise or to the elimination of an interfering signal that affects one of the functions on reception.

The invention applies in particular to any type of transmission system having multiple orthogonal carriers, for which information that has been put into the form of data symbols (cells that have been quadrature amplitude modulated (QAM), quadrature phase shift keyed (QPSK), . . . ) is multiplexed on $N_{pm}$ orthogonal subcarriers from amongst $N_{FFT}$ subcarriers corresponding to a frequency subdivision of the instantaneous bandwidth of the transmission system of dimension $N_{FFT}$. The module performing data symbol multiplexing on the various subcarriers is referred to as an OFDM multiplex (orthogonal frequency division multiplexing module). It distributes data symbols and pilot symbols within the passband of the system. The pilot symbols have values that are known to the receiver and that are used for estimating the transmission medium or for obtaining synchronization in the frequency domain. Null guard carriers are optionally located at the edges of the spectrum and also on the central carrier. The output from the OFDM multiplex that results from summing the $N_{FFT}$ subcarriers that modulate the symbols constitutes the time-varying OFDM signal without a guard interval. It is obtained by applying an indirect Fourier transform (IFT) of size $N_{FFT}$ to the OFDM multiplex. The OFDM modulator comprises the OFDM multiplex, the operation of summing the $N_{FFT}$ modulated symbols, and inserting the guard interval corresponding to copying the end of the output from the OFDM multiplex. By analogy, a module for multiplexing and modulating transmitted symbols by orthogonal functions is also referred to below in the present document by the term "orthogonal multiplex".

The transmitted information is generally subjected to a time- and frequency-selective frequency disturbance representing the effect of a transmission channel having a transfer function H(f,t) that is highly colored because of the multi-path effect of the propagation channel, and also the effect of strong Doppler dispersion resulting from variations over time in the environment or resulting from an interfering signal that affects some of the subcarriers of the transmission system. This disturbance is represented by a frequency-selective filter that is variable over time and that filters the output from the OFDM modulator.

On reception, after eliminating the guard interval Tcp, projecting the OFDM signal onto the Fourier components associated with the k subcarriers, and integrating over all of the samples of the OFDM signal (output from the OFDM multiplex) provides an estimate $Y_{n,k}$ of the symbol $C'_{n,k}$ allocated to the carrier k of the OFDM multiplex that is weighted by the $k^{th}$ component ($H_{n,k}$) of the channel transfer function projected onto the base vectors of the OFDM multiplex and associated with a white noise component:

$$Y_{n,k} = H_{n,k} \cdot C'_{n,k} + B_{n,k} \qquad (1)$$

Multicarrier equalization of the "zero-forcing" type consists in dividing the frequency-received signal $Y_{n,k}$ by an estimated complex gain $H_{n,k}$ to extract the value of the data symbols $C'_{n,k}$ associated with a noise component colored by $H^{-1}_{n,k}$. A decision circuit then makes a decision to estimate which symbol has been transmitted among the M possible values that belong to an alphabet associated with the modulation being used (M-PSK, M-QAM, etc. . . . ).

The performance of the circuit for deciding on which symbols have been transmitted in baseband depends on the value of the transfer function for the transmission medium associated with the carrier k that modulates the symbol $C''_{n,k}$ under consideration.

In addition, on reception, the transmission medium generates correlation between the subcarriers in the frequency and time domains. The frequency correlation affects the subcarriers, and the time correlation induces subcarriers of almost constant amplitude over an observation window having a duration of the order of the coherence time of the channel. Coherence time corresponds to the mean value of the time difference necessary for ensuring decorrelation between the signal representative of the transmission medium and a time-shifted version thereof.

These two correlations limit the performance of decision-taking circuits on reception.

The time correlation induces bursts of errors after transmitted data symbol decision-taking and after decoding the estimated transmitted bits.

Frequency correlation is the result simultaneously of the multi-path effect that introduces a filtering effect, of the Doppler effect, and of phase noise in the radio frequency (RF) stages that give rise to a loss of orthogonality between the subcarriers of an orthogonal multiplex.

A method of remedying these two correlations consists in performing interleaving on transmission on the binary data or on the data symbols.

The invention relates more particularly to so-called "frequency" interleaving, i.e. interleaving that is performed in the frequency domain on the data symbols allocated to the carriers of an orthogonal multiplex. This type of interleaving occurs at the input to an orthogonal multiplex. In equivalent manner, it is common practice to speak of interleaving carriers or subcarriers.

Existing multicarrier systems that include interleaving the subcarriers of an orthogonal multiplex make use of a static law I(k) for k varying over the range 0 to $N_{pm}-1$, where $N_{pm}$ designates the number of data symbols per OFDM multiplex, for a specific transmission mode (encoding, modulation, size of Fourier transform). The document ETSI 300 401 "Radio broadcasting systems; digital audio broadcasting (DAB) to mobile, portable and fixed receivers", May 1997, p. 182 gives a description of a static frequency interleaving algorithm for the DAB multicarrier system. The interleaving law I(k) applied to the data symbols indexed from k=0 to $N_{pm}-1$ is such that the branch k' of the multiplex conveying the symbol $X_{n,k'}$ resulting from an interleaving operation is associated with the symbol $C'_{n,k}$ before interleaving by the relationship:

$$X_{n,k'}=C'_{n,I(k)}, I(k) \in \{0,\ldots,N_{pm}-1\}$$

where I(k) describes the read order in the input sequence of the position indices of the carriers after interleaving.

By writing k' for the position index of the symbol $X_{n,k'}$ on the OFDM multiplex after the data subcarriers of the multiplex have been interleaved, and writing $C_{n,k}$ for the data symbol associated with carrier k before interleaving, the corresponding received symbol, after OFDM demodulation, and associated with the carrier k' has the form:

$$Y_{n,k'}=X_{n,k'}\cdot \hat{H}_{n,k'}+B_{n,k'} \text{ with } k'=\{0,\ldots N_{pm}-1\} \quad (2)$$

The operation of deinterleaving subcarriers designated by the function $I^{-1}(k)$ generates a signal such that:

$$Y_{n,k}=C'_{n,k}\cdot H_{n,I^{-1}(k)}+B_{n,I^{-1}(k)}, k=\{0,\ldots,N_{pm}-1\} \quad (3)$$

The deinterleaving operation as performed on the complex gains $H_{n,k'}$ of the channel transfer function serves to reduce the instantaneous frequency correlation of the transmission medium, but does not reduce the time correlation that limits the performance of binary interleaving situated upstream from the method.

The static character of the interleaving limits the decorrelation properties of an interleaving method since it does not modify the time-selectivity properties of the transmission medium.

French patent application FR 05 53763 filed on Dec. 7, 2005 and entitled "Dynamic interleaving method and device" proposes improving static interleaving algorithms. Its content is hereby incorporated by reference. It proposes a time-varying block interleaving law of size K that is applied to the carriers of an OFDM multiplex. An implementation of the method with a particular OFDM system is shown diagrammatically in FIG. 1. The system SY comprises a transmitter device EM and a receiver device RE. The transmitter device includes channel encoding CC, binary interleaving EB, symbol binary encoding CBS, an interleaver ES, a framer MT, and an OFDM modulator MX. The transmitted signal Sn(t) is conveyed by the transmission channel CN. White noise B is added to the signal in transmission. The receiver RE comprises an OFDM demodulator DMX, a de-framer DMT (inverse of the framer MT), a deinterleaver DES, a symbol binary decoder DCBS, a binary deinterleaver DEB, and a decoder DCC. In one of the configurations implemented, the block for interleaving of size K, where K is a multiple of $N_{pm}$, is constituted by the set of data symbols associated with one or more OFDM symbols and it varies once every N OFDM symbols. NN interleaving laws are defined as a function of the block size K, where K is a multiple of the number of data symbols $N_{pm}$ per OFDM multiplex, and as a function of optimum parameters for the interleaving algorithm that specify the interleaving laws and the interleaving spreading between interleaved data items.

The interleaving that is preferably selected is iterative interleaving with a turbo structure that is determined by three integer parameters K, p, and q, and also by the iteration j of the algorithm. Such turbo structure interleaving constitutes the subject matter of the French patent application published on Jul. 7, 2006 under the No. 2880483. That turbo structure interleaving is such that a modification to the parameters or the iteration of the algorithm serves to modify the interleaving pattern and also the interleaving spreading which is defined as follows:

$$\Delta_{\mathit{eff}}I_{p,q}^{(j)}(s)$$

Interleaving spreading is defined as being the smallest distance after interleaving between two input data position indices that are separated at the output from the interleaving module by s−1 data items. Interleaving spreading is given by the relationship:

$$\Delta I_{\mathit{eff}}(s)=\text{Min}_{k,k \in S}|I(k+s)-I(k)|$$

The function |X| provides the absolute value of X. The interleaving laws are selected as a function of an imposed minimum value for the interleaving spreading; a selected interleaving law makes it possible to obtain interleaving spreading that is greater than said minimum.

For a particular configuration illustrated in FIG. 2, the interleaving method is performed at the scale of an OFDM symbol and incorporates a portion of the guard carriers of the OFDM multiplex in the interleaving process. The size of the interleaving block is then a size $N'_{pm}$ where $N'_{pm}$ lies in the range $N_{pm}$ to $N_{FFT}$. $N_{pm}$ corresponds to a number of data carriers per OFDM multiplex. The value of $N'_{pm}$ is the sum of the $N_{pm}$ data carriers plus $n_0$ guard carriers. Typically, $n_0$ can vary over the range zero and a number $n_{max}$ corresponding to about 10% of the number $N_{pm}$ of data symbols, or typically corresponding to $(N_{FFT}-N_{pm}-N_{pilot})/2$ where $N_{pilot}$ corresponds to the number of pilot symbols per OFDM multiplex dedicated to channel estimation, and to a synchronization or signaling device. This limit $n_{max}$ is set empirically.

The method serves to whiten the frequency disturbance introduced by the transmission medium via the dynamic property of the interleaving applied to the data symbols prior to multiplexing the symbols on the OFDM multiplex. Taking account of the $n_0$ null carriers in the dynamic interleaving process serves to improve the overall performance of the transmission system since it introduces increased frequency selectivity to the transmission medium in combination with a higher rate of variation by modifying the interleaving law $I_n(k)$ every N OFDM symbols. This notional additional rate of variation does not give rise to any additional Doppler dispersion. Furthermore, it reduces the loss of orthogonality between subcarriers by inserting a null carrier between two data carriers, thereby increasing the intercarrier spacing between two adjacent data carriers without reducing the overall spectrum efficiency of the system.

Nevertheless, the position diversity of the carriers introduced by this dynamic interleaving with insertion of null carriers, does not suffice to eliminate carriers that are very noisy or that are affected by an interfering signal in transmission. The null carriers are multiplexed in the multiplex via the permutation law and not via an estimate of the noise on each subcarrier of the multiplex.

SUMMARY OF THE INVENTION

One object of the present invention is to provide a method of frequency interleaving that is more effective than are known methods for a transmitter device including a module for multiplexing and modulating by means of orthogonal functions known as an orthogonal multiplex, in particular an OFDM multiplex, in order to eliminate carriers that are very noisy or that are affected by an interfering signal in transmission by the channel.

To this end, one aspect of the present invention provides a mixed method of interleaving symbols that are to be allocated to carriers of a multicarrier transmitter device comprising a module for multiplexing and modulation by $N_{FFT}$ orthogonal functions, the transmitter device implementing a set of carriers made up of data carriers and null carriers, and the method comprising the steps of:

selecting in time-varying manner, from the set of carriers, $N_{pm}$ carriers dedicated to conveying data symbols, as a function of an estimate of a transfer function of a transmission channel for a transmitted signal corresponding to the modulated orthogonal symbols generated from data symbols by the module for multiplexing and modulation;

inserting $n_0$ null carriers within the preceding selection at positions that are determined as a function of the estimate of a transfer function in order to form a block of $N'_{pm}$ carriers dedicated to transmitting a symbol block; and dynamically interleaving a block of carriers comprising the $N_{pm}$ data carriers.

Another aspect of the invention is directed to a mixed interleaver of symbols that are to be allocated to carriers of a multicarrier transmitter device including a module for multiplexing and modulation by $N_{FFT}$ orthogonal functions, the interleaver device implementing a set of carriers made up of data carriers and null carriers, and comprising:

means for selecting $N_{pm}$ carriers in time-varying manner from the set of carriers, the selected carriers being dedicated to transmitting data symbols, and being selected as a function of an estimate of a transfer function of a transmission channel for a transmitted signal corresponding to the modulated orthogonal symbols generated from data symbols by the module for multiplexing and modulation;

means for inserting $n_0$ null carriers within the preceding selection at positions determined as a function of the estimate of a transfer function so as to form a block of $N'_{pm}$ carriers dedicated to transmitting a symbol block; and means for dynamically interleaving a block of carriers comprising the $N_{pm}$ data carriers.

Another aspect of the invention is directed to a system comprising a transmitter device and a receiver device. The transmitter device includes a frequency interleaver as defined above. The receiver device includes a module for demultiplexing and demodulating symbols by $N_{FFT}$ orthogonal functions suitable for demodulating an estimator symbol having its real portion equal to one and its imaginary portion equal to zero in order to estimate a transfer function of a transmission channel, and a deinterleaver serving to deinterleave demodulated symbols in application of a law that is the inverse of an interleaving law implemented by the transmitter device, the deinterleaver being suitable for calculating the deinterleaving law at determined instants, since the interleaving law varies over time for a given transmission mode.

The mixed interleaving makes use of a fraction of the guard carriers placed at the ends of the OFDM multiplex to eliminate certain carriers in the useful band of the OFDM multiplex and replace them with null guard carriers. In a preferred embodiment, the guard carriers are changed into data carriers so as to avoid degrading the overall spectrum efficiency of the system. The positions of the null carriers in the useful band of the OFDM multiplex takes account of a prior estimate of the complex gains of the transfer function of the channel on those carriers, unlike previously-known methods.

Thus, mixed interleaving according to an embodiment of the invention that selects subcarriers for transmitting data symbols on an OFDM multiplex and that replaces subcarriers that are very noisy on reception with null carriers serves to improve the performance of the decision-taking circuits on reception. These carriers can be positioned in the OFDM multiplex during data framing MT.

The dynamic interleaving that is performed, which consists in using an interleaving law that varies over time for application to the data symbols, for a given transmission mode, makes it possible to generate notional time variability in the transmission channel, thereby imparting statistical properties thereto that tend towards Gaussian noise. This makes it possible to reduce the time correlation that affects a transmission system in which the data symbols are multiplexed and then modulated, in particular an OFDM system, and consequently serves to improve decision-taking on reception.

Interleaving in accordance with an embodiment of the invention also makes it possible in a particularly advantageous manner to accentuate the linked modification of the coherence band, which relates to the frequency domain of the orthogonal multiplex, where the coherence band of the channel corresponds to the mean value of the frequency difference needed to ensure decorrelation between two frequency components of the transfer function of the transmission channel, and of the coherence length, which relates to the time or space domain of the transmission channel, and also to reduce the impact of the RF stages. For this purpose in particular, the method performs dynamic block interleaving of a block made up of data symbols for an orthogonal multiplex and null symbols previously inserted at the ends of the block, while eliminating any multiplexing of these carriers on the very noisy carriers that are set to zero during framing MT. This has the effect in particular of introducing null symbols into the passband of the orthogonal multiplex, typically an OFDM orthogonal multiplex, at positions that vary over time because of the dynamic interleaving.

In a particular embodiment, the linked modification is obtained by means of an iterative interleaving algorithm applied to the null symbols and to the data symbols, using an interleaving law that varies, for example depending on the iteration in question. That algorithm constitutes the subject matter of French patent application No. FR 04 14113. Its content is hereby incorporated by reference. Typically, after N modulated orthogonal symbols, the algorithm uses an interleaving law that differs in the number of iterations or in the interleaving parameters, in compliance with the overall optimizations and constraints of the transmission system.

An interleaving law I(k) for a block of size K is a bijective function that gives the order in which it is necessary to read at the output an input sequence formed by K data items indexed by an index k varying from 0 to K−1. An input sequence to an interleaver having an interleaving law I(k) is written X(k).

The sequence at the output from the interleaver is written Y(k). Then Y(k)=X(I(k)): the $k^{th}$ data item of the interleaved sequence having position index k−1 corresponds to the data item of index I(k−1) of the input sequence X(0), ..., X(K−1). The data items input to the interleaver and the interleaved data items at the output are represented below in the present document solely by their indices k, unless specified to the contrary.

The dynamic interleaving is performed on a block of $N'_{pm}$ symbols constituted by non-null data symbols and by null symbols, the block corresponding at the orthogonal multiplex to $N'_{pm}$ subcarriers of a modulated orthogonal symbol, typically an OFDM symbol. $N'_{pm}$ lies in the range $N_{pm}$, the number of data carriers, and $N_{FFT}$, the size of the orthogonal multiplex. These $N'_{pm}$ symbols are allocated to carriers of a group made up of the data carriers carrying a modulated orthogonal symbol, typically an OFDM symbol, and of a fraction of null carriers that are located at the ends of the modulated orthogonal symbol spectrum, typically OFDM.

In a particular embodiment, the time variation of the interleaving law depends on a time index of the symbols of the orthogonal multiplex. Each of these symbols possesses an index associated with the positions of the carriers in the orthogonal multiplex, and an index associated with the instant of transmission of an orthogonal signal in a time pattern. This signal is referred to below in this document by the term "modulated orthogonal symbol". In particular, the interleaving law can vary after modulating a block of N modulated orthogonal symbols, typically OFDM symbols, where N is a parameter that is determined typically as a function of the properties of the transmission channel and as a function of data framing, with N≧1. In another particular embodiment, the interleaving applies to a block of M symbols, and the time variation of the interleaving law takes place after the block of M symbols has been interleaved. More particularly, M is a multiple of the number of carriers $N'_{pm}$ of the orthogonal multiplex, $N'_{pm} \leq N_{FFT}$, and is a submultiple of N.

Inserting null carriers reinforces the effect of modifying the properties of the transmission channel as already obtained by the dynamic interleaving, by shifting the null carriers to varying positions within the passband of the system.

Optimizing the positions of these carriers relative to the dynamic frequency interleaving implemented makes it possible to combine a selection diversity technique with the dynamic interleaving. The total spectrum efficiency of the system, i.e. the ratio of the useful data rate to the total bandwidth of the system, is unchanged since the method makes use of the null carriers that are located at the edges of the spectrum. Thus, unlike previously-known interleaving devices that, given their poor effectiveness in the face of Doppler variations, are in fact applied to useful data for transmission and not to data that is dedicated to signaling, to transmission channel estimation, or to synchronization, a method of the invention can make use of data that is not useful, namely some of the null carriers of an orthogonal multiplex.

Incorporating null carriers in the passband of the system at positions that are determined, and that vary over time, improves the decorrelation of the carriers and reduces the loss of orthogonality of the carriers, in particular when the transmission channel is dispersive, in particular by increasing the intercarrier spacing in the vicinity of a null carrier in the orthogonal multiplex. Such a method makes it possible to eliminate carriers affected by an interference signal or carriers that are very noisy, and makes it possible to modify the properties of the transmission channel in the time and frequency domains and to reduce jointly the frequency correlation and the time correlation that affect a system, in particular of the OFDM type. This method is found to be particularly advantageous for short-range systems delivering high data rates, and thus requiring shallow interleaving depths performed upstream of the invention. This applies to ultra wideband systems such as the systems defined by working group 802.15.3a TG constituted by the MBOA alliance, having the references "Physical layer submission to 802.15 task group 3a: multiband orthogonal frequency division multiplexing", MBOA website, Sep. 14, 2004, to systems defined in the millimeter band (wideband and ultra wideband) or indeed to systems of the radio local loop type as defined in IEEE standard 802.16-2004, IEEE standard for local and metropolitan area networks, part 16: Air interface for fixed broadband wireless access systems, October 2004. The method is also found to be pertinent for systems affected by a large amount of Doppler dispersion. Introducing null carriers at positions that vary over time makes it possible to reduce the loss of orthogonality between carriers while ensuring whitening of the disturbance generated by the transmission channel on the communications signal. Typically, the number of null symbols added during frequency interleaving is adjusted on the basis of a priori knowledge of the correlation properties of the transmission channel and of the number of null carriers conventionally added during OFDM modulation.

The fact that the added symbols are nulls serves to avoid adding additional noise.

In an embodiment, the transfer function of a transmission channel is estimated by means of an estimator modulated orthogonal symbol. It is derived from modulation by means of a number $N''_{pm}$ of carriers lying in the range $N_{pm}$ to $N_{FFT}$, where $N_{pm}$ is the initial number of non-null carriers in the transmitter device. The $N''_{pm}$ data symbols of the estimator modulated orthogonal symbol have their real portion equal to one and their imaginary portion equal to zero. In this embodiment, the method thus periodically inserts an estimator OFDM symbol into a frame structure made up of $NN_0$ OFDM symbols in which the first OFDM symbol is known as the estimator OFDM symbol and the following $NN_0-1$ OFDM symbols are for conveying information. The corresponding estimator OFDM multiplex is made up of $N''_{pm}$ symbols in which the real portion is equal to unity and the imaginary portion is zero. The estimator OFDM symbol is used to estimate the complex gains of the transfer function of the channel over the duration of the frame. This estimate makes it possible to select $N_{pm}$ carriers allocated to transmitting data symbols in the OFDM multiplex prior to interleaving a selection of symbols. $N''_{pm}$ is set empirically and lies in the range $N'_{pm}=N_{pm}+n_0+N_{pilot}$ and $N_{FFT}$, the size of the Fourier transform of the multicarrier modem, where $n_0$ is the number of null carriers inserted before interleaving.

The time-varying selection of carriers allocated to conveying data symbols and the positions of the $n_0$ null carriers in the OFDM multiplex makes use of a decision threshold S' applied to the complex gains of the noisy transfer function of the propagation channel as deduced from the OFDM demodulation of the estimator symbol. This threshold S' lies between the harmonic mean $S_0$ and the arithmetic mean $S_1$ of the moving harmonic mean MH of the modulus squared of the complex gains of the transfer function of the channel. The complex gains of the transfer function of the channel are determined from the received symbols $H_{n',k}^{estim}$ corresponding to the estimator OFDM multiplex. Each component k of a received symbol $H_{n',k}^{estim}$ is made up of a component k of complex gain $H_{n',k}$ of the transfer function of the transmission channel and a component k of Gaussian noise $B_{n',k}$, where n'Ts designates the transmission instant of the estimator symbol, such that $H_{n',k}^{estim}=H_{n',k}+B_{n',k}$. The threshold S' is adjusted so that $N_{pm}$ subcarriers amongst $N'_{pm}$ subcarriers have power greater than said threshold, and so that $n_0$ subcarriers are selected to have power below the threshold. The harmonic mean is equal to the reciprocal of the arithmetic mean of the reciprocal of the observations. The moving harmonic mean estimated on the modulus squared of the complex gains of the estimator symbol is given by the following equation:

$$\frac{1}{MH(n', k_0)} = \frac{1}{n_0} \sum_{k=0}^{k=n_0-1} \frac{1}{|H_{n',k+k_0} + B_{n',k+k_0}|^2} \quad (4)$$

The harmonic mean is calculated for $N'_{pm}$ samples over an observation window having $n_0$ samples. For the most recent $n_0$ samples of the noisy transfer function of the estimator symbol, the moving mean is calculated over a variable observation window having a negative increment of step size −1, starting from an initial value equal to $n_0$.

In a preferred implementation with optimization of interleaving, the dynamic selection of the carriers allocated to transmitting data, and the dynamic positioning of null carriers, are performed in co-operation with selecting an interleaving law so as to generate dynamic frequency interleaving of the symbols of an orthogonal multiplex of size $N'_{pm}$ in such a manner that the interleaving spreading between subcarriers is optimized relative to the transmission system. For a specified interleaving size $N'_{pm}$ incorporating $N_{pm}$ data carriers and $n_0$ null carriers, NN' interleaving laws are generated relative to the interleaving algorithm that is implemented using as a constraint a target interleaving spreading between two adjacent carriers or two carriers that are separated by s−1 subcarriers. From amongst the above NN' laws, the method selects NN laws as follows. For each law taken from amongst the NN' laws, the method proceeds with deinterleaving of size $N'_{pm}$ of the complex gains of the noisy transfer function of the estimator symbol at the output from the OFDM demodulator of the estimator symbol. The threshold S' is then compared with the distribution of the moduluses squared of the deinterleaved complex gains of the estimator symbol. The samples for which the moduluses squared of the complex gains are less than the threshold and that are located in the spectrum determine the locations of the carriers that are zeroed in the interleaved block. The minimum distance between null carriers is calculated on the basis of this signal. The interleaving law is suitable for selection providing it ensures interleaving spreading between null carriers of the estimator symbol, after deinterleaving, that is greater than the ratio $N_{pm}/n_0$.

An embodiment of the invention implements the NN frequency interleaving laws after inserting null carriers in the positions given by the algorithm for positioning null carriers over the $N'_{pm}$ symbols of the OFDM multiplex. The inserting and positioning of null carriers in the orthogonal multiplex relies on the decision threshold and on an interleaving algorithm that positions these guard carriers in optimum manner in the useful portion of the multiplex relative to multicarrier equalization on reception. Optimization of the interleaving operation on the symbols of an orthogonal multiplex is performed beforehand by selecting NN' interleaving laws having a target interleaving spreading between two adjacent carriers or two carriers separated by s−1 subcarriers. The number of laws NN that are implemented on transmission is a submultiple of $NN_0-1$.

BRIEF DESCRIPTION OF THE DRAWINGS

Features of the invention appear from the following description with reference to the accompanying figures given as non-limiting examples.

DETAILED DESCRIPTION OF THE DRAWINGS

Figure 1:
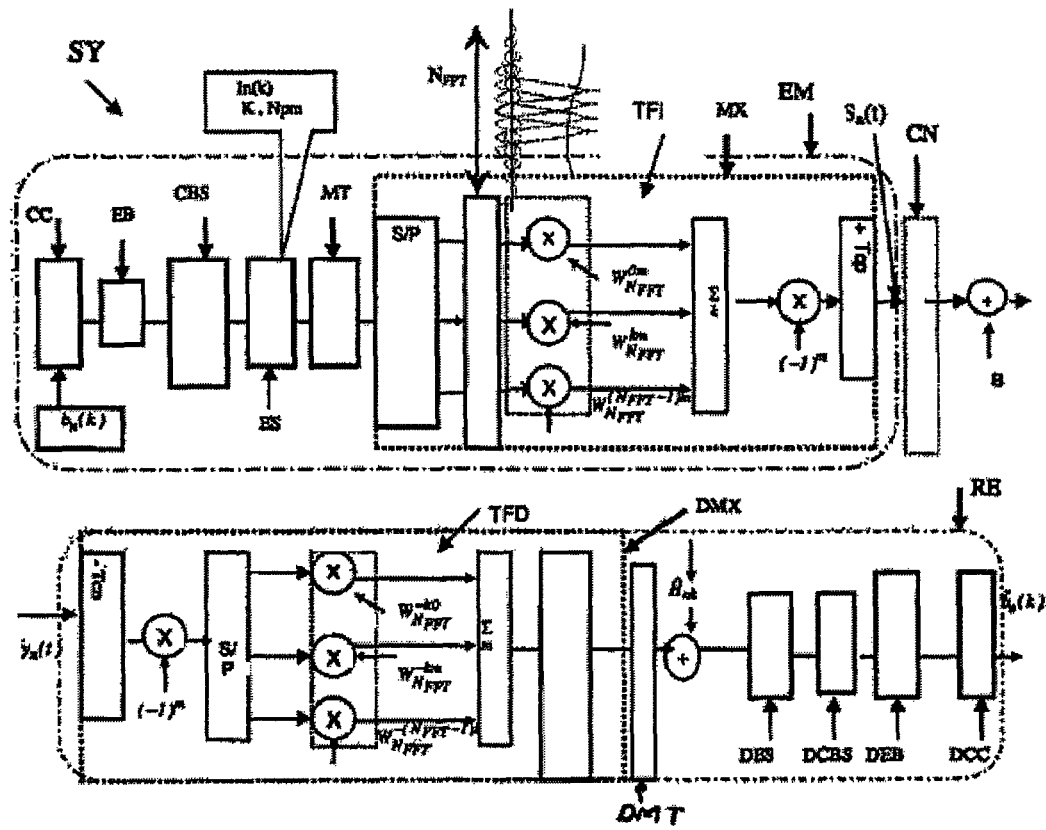
FIGS. 1 and 2 are diagrams showing a prior art interleaving method.
Figure 2:
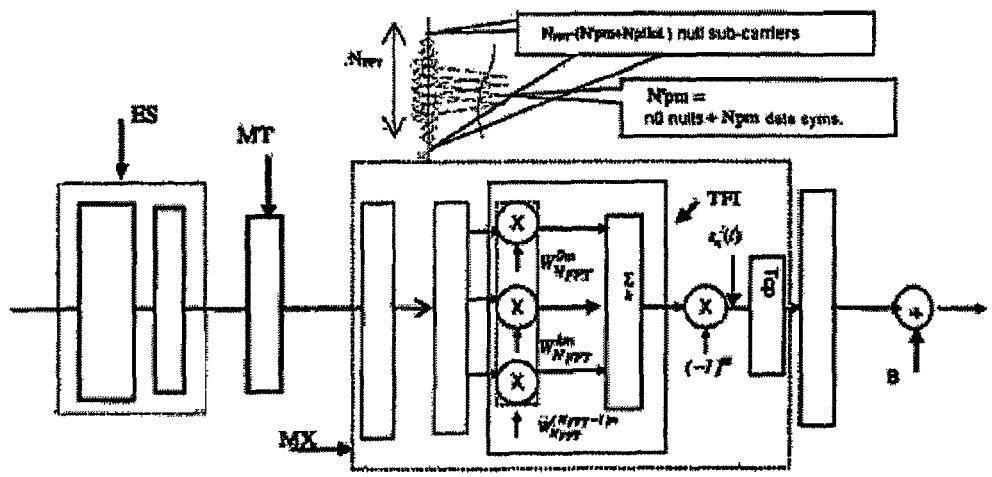
Figure 3:
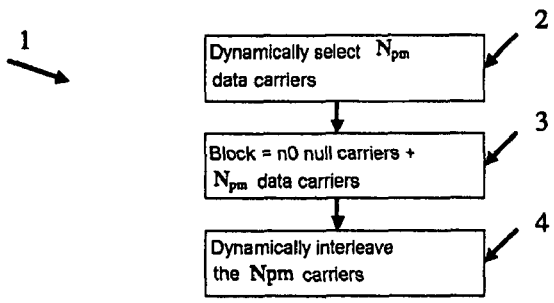
FIG. 3 is a flow chart of a method of the invention.

FIG. 3 is a flow chart of a mixed symbol interleaving method of the invention. The method is preferably implemented with computer instructions stored and executed in a microprocessor or FPGA, for example. The symbols are for allocation to carriers of a multicarrier transmitter device comprising a module for multiplexing and modulation by $N_{FFT}$ orthogonal functions. The device implements a set of carriers formed by data carriers and by null carriers.

In a first step, the method 1 selects 2 $N_{pm}$ carriers in time-varying manner from the set of carriers, the selected being carriers dedicated to conveying data symbols as a function of an estimate of a transfer function for a transmission channel of a transmitted signal corresponding to the modulated orthogonal symbols generated from data symbols by the multiplexer and modulator module.

In a second step, the method inserts 3 $n_0$ null carriers at positions within the previous selection that are determined as a function of the estimate of a transfer function, in order to form a block of $N'_{pm}$ carriers dedicated to conveying a block of symbols.

In a third step, the method dynamically interleaves (4) a block of carriers comprising the $N_{pm}$ data carriers.

Figure 4:
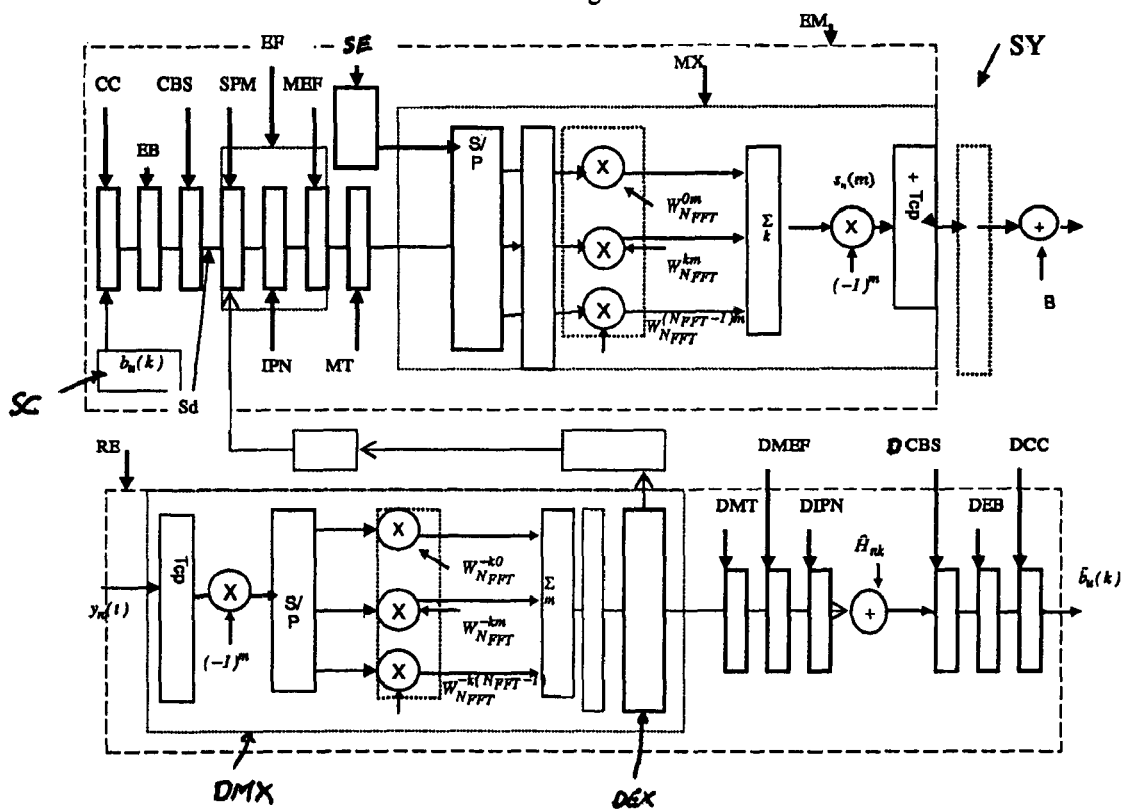
FIG. 4 is a diagram showing an example of a transmitter system implementing a mixed interleaving method in accordance with an embodiment of the invention.

FIG. 4 is a diagram showing an example of a transmission system SY implementing an interleaving method of the invention. The transmission system comprises a multicarrier transmitter device EM and a receiver device RE. The transmitter device EM comprises a module SC for generating source data, a module CC for channel encoding, a module EB for binary interleaving, a module CBS for symbol binary encoding, a frequency interleaver EF, a framer device MT, a module for generating an estimator symbol SE, and an OFDM modulator MX.

The frequency interleaver EF comprises a module SPM for selecting carriers dedicated to transmission, a module IPN that inserts null carriers in determined positions, and a frequency interleaver module MEF.

The symbol frequency interleaver module MEF comprises in particular a device for computing the interleaving law such that the computed block interleaving law varies over time for a given transmission mode of the multicarrier transmitter device EM.

The framer device MT distributes the data symbols and the pilot symbols in a multiplex of the OFDM modulator MX.

The module SE for generating an estimator symbol generates $N''_{pm}$ data symbols to make up an estimator OFDM symbol that is inserted periodically in a frame structure made up of $NN_0$ OFDM symbols. The $N''_{pm}$ data symbols have their real parts equal to one and their imaginary parts equal to zero.

The OFDM modulator MX comprises a multiplex. The modulator comprises $N_{FFT}$ carriers, $N_{pm} \leq N_{FFT}$.

The receiver device RE comprises an OFDM demodulator DMX comprising a demultiplexer DEX, a deinterleaver module DMEF, and a module DIPN for eliminating null carriers. The deinterleaver module DMEF performs demodulated symbol deinterleaving using a law that is the inverse of an interleaving law. The deinterleaving module is suitable for computing at given instants the deinterleaving law that varies over time for a given transmission mode. The module DIPN eliminates the null carriers inserted on transmission by the module IPN.

An interleaving method 1 of the invention is implemented by a frequency interleaver EF of the transmitter device EM. It applies to the data symbols Sd coming from the symbol binary encoding CBS.

The method of the invention selects $N_{pm}$ contiguous data symbols Sd in baseband, the symbols being made up of m code bits that are converted into the form of complex signals, as a function of an estimate of a transfer function of the transmission channel. In each block of $N_{pm}$ symbols, the positions of the symbols are indexed by an integer k that varies over the range 0 to $N_{pm}-1$ and that corresponds to the carrier index.

The method of the invention applies an interleaving law $I_n(k)$ to each block of $N_{pm}$ symbols. The interleaving law $I_n(k)$ is of size $N_{pm}$ and of time index n that varies over the range 1 to NN, where NN corresponds to the number of different interleaving laws implemented by the method. The law in use varies over time, e.g. once every N OFDM symbols.

The method inserts $n_0$ null symbols among the $N_{pm}$ interleaved data symbols with a given distribution so as to form a block made up of $N'_{pm}$ symbols. $n_0$ may typically vary over the range zero to a number $n_{max}$ corresponding to about 10% of the number $N_{pm}$ of data symbols, or typically corresponding to $(N_{FFT}-N_{pm}-N_{pilot})/2$, where $N_{pilot}$ corresponds to the number of pilot symbols per OFDM multiplex dedicated to channel estimation, to a synchronization device, or to a signaling device. This limit $n_{max}$ is set empirically. The positions of the $n_0$ null symbols are determined as a function of an estimate of a transfer function of the transmission channel; the $n_0$ null symbols are positioned so as to reduce to zero carriers that are very noisy.

The $N'_{pm}$ symbols are put into a frame.

In accordance with conventional generation of an OFDM signal over time, as implemented by means of an inverse Fourier transform of size $N_{FFT}$, pilot symbols are optionally added during framing, and $n_1$ null symbols are inserted symmetrically to the ends of a multiplex made up of the $N'_{pm}+N_{pilot}$ branches so as to form an OFDM multiplex having $N_{FFT}$ branches, where $N'_{pm} \leq N_{FFT}$.

Each carrier fk of index k of the OFDM multiplex modulates a symbol of the branch k with the help of the Fourier component:

$$w_{N_{FFT}}^{k_m} = \exp\left(j2\pi \frac{k_m}{N_{FFT}}\right)$$

where k varies over the range 0 to $N_{FFT}-1$, providing the samples are multiplied in alternation by $(-1)^m$ at the output from the inverse Fourier transform, and where m corresponds to the index of the sample at the output from the OFDM multiplex MX.

The number $n_1$ of null symbols added to the ends of the multiplex after framing depends on the size $N_{FFT}$ of the inverse Fourier transform (IFT), on the size $N_{pm}$ of a group of data symbols, on the number $n_0$ of null symbols added to form a block of size $N'_{pm}$ symbols, and on the number of pilot symbols $N_{pilot}$ added during framing, $$n_1 = N_{FFT} - N'_{pm} - N_{pilot} = N_{FFT} - (N_{pm}+n_0) - N_{pilot}$$

The number of so-called null carriers to which a null symbol is applied is thus equal to $n_0$ plus $n_1$.

In a variant of the method, a fraction $n_0'$ of the $n_1$ null carriers is added to the $N_{pm}$ selected carriers to form a block of carriers on which the dynamic interleaving is performed.

Figure 5:
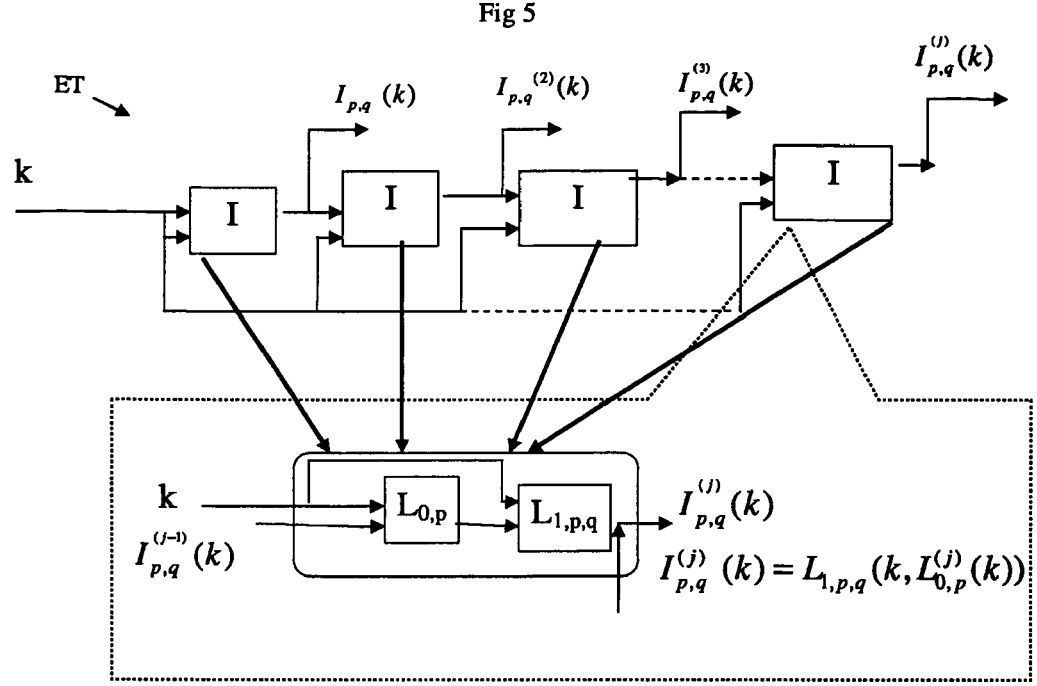
FIG. 5 is a diagram showing operations of an interleaving device implementing an iterative interleaving algorithm enabling an interleaving law to be obtained that varies over time for a method in accordance with an embodiment of the invention.

FIG. 5 presents a diagram showing operations of an interleaver device ET implementing an iterative interleaving algorithm serving to obtain an interleaving law that varies over time. Interleaver device ET can be part of the frequency interleaver MEF shown in FIG. 4, and it can be implemented as a microprocessor with a computer code stored therein or by means of a microprogrammed circuit such as FPGA (field programmable gate array) The interleaver device ET serves to obtain time-varying interleaving laws by modifying the parameters of the algorithm and/or the number of iterations of the algorithm, for an interleaving method of the invention.

The interleaver of FIG. 5 is a detailed description of a particular mode to obtain time-varying law $I_{p,q}^{(j)}(k)$ used for example by the MEF of FIG. 4 which applies an interleaving law $I_n(k)$, $\Rightarrow I_{p,q}^{(j)}(k)$ with a determined value for j, p and q where j can vary with time to obtain a $I_n(k)$ variable with time.

The interleaver device ET implementing the algorithm has as many base cells I as it has iterations. The output of the $j^{th}$ base cell I, $I_j$, which corresponds to the $j^{th}$ iteration, delivers an interleaving pattern that is expressed in the form:

$$I_{p,q}^{(j)}(k)$$

where p and q are two integer parameters describing a base function I, and j is the iteration associated with I. Implementing the algorithm serves to perform block interleaving of size K with J iterations of index j, where J is greater than or equal to 1, on digital input data that is indexed by a variable $k=\{0, \ldots, K-1\}$.

Each base cell I of the interleaver device ET presents the same structure: two inputs, one output, and two individual cells $L_{0,p}$ and $L_{1,p,q}$. The integers p and q are two parameters of the interleaving law that serve to generate the desired law. Each individual cell $L_{0,p}$ and $L_{1,p,q}$ has two inputs and one output. One of the two inputs of the two cells $L_{0,p}$ and $L_{1,p,q}$ is identical for these two functions and corresponds to varying the sample index prior to interleaving. The two inputs of the individual cell $L_{0,p}$ correspond to the two inputs of the base cell I to which it belongs, the output of the individual cell $L_{1,p,q}$ corresponds to the output of the base cell I to which it belongs. The output from the individual cell $L_{0,p}$ is connected to a first input of the individual cell $L_{1,p,q}$. The second input of the individual cell $L_{1,p,q}$ is connected to a first input of the base cell I to which it belongs; this input of the base cell I is fed with the indexes k for interleaving that are generally presented in the form of a ramp going from 0 to K−1. The second input of the base cell I is connected to the output from the preceding base cell I, except for the first base cell, where both inputs are connected together and correspond to the index k.

The interleaving algorithm $I_{p,q}^{(j)}(k)$ thus relies on an iterative structure for which the interleaving law depends on three parameters (K, p, q) and the iteration under consideration j. K corresponds to the size of the block to be interleaved, p and q are two parameters that modify the properties of the interleaver device, in particular the interleaving law and the interleaving spreading written:

$$\Delta_{eff}I_{p,q}^{(j)}(s).$$

The interleaving spreading corresponds to the minimum distance after interleaving of the position indices of input data items separated by s−1 items. The iteration is selected so as to modify the interleaving law and the interleaving spreading while conserving a pattern of size p. The variation over time in the interleaving law is obtained by modifying either the iteration, or one of the parameters p and q of the interleaver device depending on a criterion for optimizing the law, or else on a constraint associated with the transmission system.

This interleaving that relies on combining two algebraic functions $L_{0,p}$ and $L_{1,p,q}$ of "turbo" structure has the property of preserving a pattern, i.e. of conserving the multiplexing order of p data streams after interleaving, where p is a parameter of the interleaving algorithm that is a submultiple of the block interleaving size K, and q is an integer parameter that makes it possible to vary the interleaving law and the interleaving spreading. In a typical implementation, q is set arbitrarily at two for reasons of simplicity, and p sets the size of the pattern.

This pattern-preservation property turns out to be of great advantage for preserving optimization operations relying on multiplexing p data items as performed upstream or downstream of the interleaving operation.

The interleaving law $I_{p,q}^{(j)}(k)$ given by the output from the interleaver module I for iteration (j) is the result of combining two two-input and one-output algebraic functions $L_{0,p}$ and $L_{1,p,q}$ as described below:

$$L_{0,p}(k,k1)=[-k-k_1 \cdot p]_K \; k=\{0,\ldots,K-1\}$$

$$L_{1,p,q}(k,k_2)=[K-p+k+q \cdot p \cdot k_2]_K \; k=\{0,\ldots,K-1\}$$

$$I_{p,q}(k,k1)=L_{1,p,q}(k,L_{0,p}(k,k1)) \quad (5)$$

For iteration j=1, the inputs k and $k_1$ of the function $L_{0,p}$ are identical and correspond to the position indices of data at the input to the interleaving method. This gives rise to the following expressions for a pattern of size p and a parameter q:

$$L_{0,p}(k,k)=[-k-p \cdot k]_K$$

$$I_{p,q}(k)=L_{1,p,q}(k,L_{0,p}(k))=[K-p+k+q \cdot p \cdot L_{0,p}(k,k)]_K \; k=\{0,\ldots,K-1\}$$

$$I_{p,q}(k)=[K-p+k+q \cdot p \cdot [-k-p \cdot k]_K]_K \; k=\{0,\ldots,K-1\} \quad (6)$$

The outputs from the algebraic functions $L_{0,p}$ and $L_{1,p,q}$ for iteration (j) are given respectively by the law $L_{0,p}^{(j)}(k,k_1)$ and $L_{1,p,q}^{(j)}(k,k_2)$ for which the variables $k_1$ and $k_2$ are fed respectively by the interleaving law of the preceding iteration $I_{p,q}^{(j-1)}(k)$ and the output of the function $L_{0,p}$ for the current iteration (j).

For iteration j, equation block (2) has the form:

$$L_{0,p}^{(j)}(k)=[-k-p \cdot I_{p,q}^{(j-1)}(k)]_K \; k=\{0,\ldots,K-1\}$$

$$I_{p,q}^{(j)}(k)=L_{1,p,q}(k,L_{0,p}^{(j)}(k))=[K-p+k+q \cdot p \cdot L_{0,p}^{(j)}(k)]_K \; k=\{0,\ldots,K-1\}$$

$$I_{p,q}^{(j)}(k)=[K-p+k+q \cdot p \cdot [-k-p \cdot I_{p,q}^{(j-1)}(k)]_K]_K \; k=\{0,\ldots,K-1\} \quad (7)$$

The interleaved output data sequence Y(k) is associated with the input data sequence X(k) prior to interleaving by the following relationship:

$$Y(k)=X(I_{p,q}^{(j)}(k))$$

The pseudo-periodic and algebraic structure of the algorithm makes it possible to pre-calculate the interleaving spreading $$\min_{0 \leq k \leq K-1} |I_{p,q}^{(j)}(k+s) - I_{p,q}^{(j)}(k)|$$

between data items separated by s−1 items.

The interleaving spreading corresponds to the minimum distance between the position indices of data items separated by s−1 items in the input sequence after interleaving.

The interleaving spreading $\Delta_{eff} I_{p,q}^{(j)}(s)$ for iteration (j) of the interleaving law $I_{p,q}^{(j)}(k)$ is determined from a polynomial $P_{j,p,q,s}(k)$:

$$P_{j,p,q,s}(k)=I_{p,q}^{(j)}(k+s)-I_{p,q}^{(j)}(k)=s-[q \cdot p \cdot (s+p \cdot P_{j-1,p,q,s}(k))]_K$$

$$\Delta_{eff} I_{p,q}^{(j)}(s)=\min_k \{|P_{j,p,q,s}(k)|, K-|P_{j,p,q,s}(k)|\}$$

$$\Delta_{eff} I_{p,q}^{(j)}(s)=\min_k \{|s-[q \cdot p \cdot (s+p \cdot P_{j,p,q,s}(k))]_K|, K-|s-[q \cdot p \cdot (s+p \cdot P_{j,p,q,s}(k))]_K|\} \quad (8)$$

This algebraic function $P_{j,p,q,s}(k)$ depends on the interleaving parameters p and q, where p corresponds to the greater size of the preserved pattern, q is a parameter that modifies the interleaving law, and (j) is the iteration under consideration.

In a particular implementation, the method of the invention comprises such an iterative interleaving algorithm and a module MEF of the invention for frequencing interleaving symbols includes such an interleaving device ET with a size K corresponding to a number $N_{pm}$ or $N_{pm}+n_0'$ of symbols to be interleaved per block. The interleaving law varies over time, e.g. once every N symbols, by modifying either the number of iterations, or one of the parameters p and q of the interleaving device ET for a given transmission mode. The parameters of the iterative interleaving algorithm are then indexed by a time index n that is incremented every M blocks of K symbols and of maximum value corresponding to the number of different interleaving laws, i.e. NN'−1, with N=K×M.

The interleaving law given by equation blocks (2) and (3) is modified to take account of the dynamic nature of this law as follows: $p_n$, $q_n$, and $j_n$ are the parameters selected for law $I_n(k)$ having time index n, and NN' corresponds to the number of laws under consideration:

$$I_n(k)=I_{p_n,q_n}^{(j_n)}(k)$$

$$I_{p_n,q_n}^{(j_n)}(k)=[K-p_n+k+q_n \cdot p_n \cdot [-k-p_n \cdot I_{p_n,q_n}^{(j_n-1)}(k)]_K]_K$$

$$k=\{0,\ldots,K-1\}$$

The invention claimed is:

1. A method of interleaving symbols that are to be allocated to carriers of a multicarrier transmitter device comprising a module for multiplexing and modulation by $N_{FFT}$ orthogonal functions, the transmitter device implementing a set of carriers made up of data carriers and null carriers, wherein the method comprises the steps of:
   selecting in time-varying manner, from the set of carriers, a subset of $N_{pm}$ carriers dedicated to conveying data symbols, as a function of an estimate of a transfer function of a transmission channel for a transmitted signal corresponding to the modulated orthogonal symbols generated from data symbols by the module for multiplexing and modulation; and
   inserting $n_0$ null carriers within the preceding selection at positions that are determined as a function of the estimate of a transfer function in order to form a block of $N'_{pm}$ carriers dedicated to transmitting a symbol block, wherein $N'_{pm}=N_{pm}+n_0 \leq N_{FFT}$.

2. The symbol interleaving method according to claim 1, wherein the estimate of a transfer function of a transmission channel is obtained by means of an estimator modulated orthogonal symbol generated from $N''_{pm}$ data symbols in which the real portion is equal to one and the imaginary portion is equal to zero, coming from modulation by a number $N''_{pm}$ of carriers lying in the range $N_{pm}$ to $N_{FFT}$.

3. The symbol interleaving method according to claim 2, wherein an estimator orthogonal symbol is inserted periodically among the generated orthogonal symbols.

4. The symbol interleaving method according to claim 2, wherein the data carrier selection and the null carrier insertion at determined positions are performed by means of a decision threshold S' applied to the estimate of a transfer function obtained by demodulating an estimator symbol.

5. The symbol interleaving method according to claim 1, further comprising:
dynamically interleaving a block of carriers comprising the $N_{pm}$ data carriers in accordance with a selected interleaving law.

6. The symbol interleaving method according to claim 5, wherein the data carrier selection and the null carrier insertion at determined positions is performed together with the selecting of the interleaving law under the constraint of optimum interleaving spreading between carriers.

7. The symbol interleaving method according to claim 5, wherein the interleaved block of carriers comprises, in addition to $N_{pm}$ data carriers, a determined number $n_0'$ of null carriers.

8. An interleaver of symbols that are to be allocated to carriers of a multicarrier transmitter device including a module for multiplexing and modulation by $N_{FFT}$ orthogonal functions, the interleaver device implementing a set of carriers made up of data carriers and null carriers, and comprising:
means for selecting a subset of $N_{pm}$ carriers in time-varying manner from the set of carriers, the selected carriers being dedicated to transmitting data symbols, and being selected as a function of an estimate of a transfer function of a transmission channel for a transmitted signal corresponding to the modulated orthogonal symbols generated from data symbols by the module for multiplexing and modulation;
means for inserting $n_0$ null carriers within the preceding selection at positions determined as a function of the estimate of a transfer function so as to form a block of $N'_{pm}$ carriers dedicated to transmitting a symbol block, wherein $N'_{pm} = N_{pm+n0} \leq N_{FFT}$; and
means for dynamically interleaving a block of carriers comprising the $N_{pm}$ data carriers.

9. A transmitter device including a frequency interleaver according to claim 8.

10. A system comprising a transmitter device according to claim 9.

11. A receiver device comprising:
a module for demultiplexing and demodulating symbols by $N_{FFT}$ orthogonal functions, the module being adapted for demodulating an estimator modulated orthogonal symbol having its real portion equal to one and its imaginary portion equal to zero in order to estimate a transfer function of a transmission channel; and
a deinterleaver implementing deinterleaving of demodulated symbols in application of a deinterleaving law, the deinterleaver being adapted for calculating at determined instants the time-varying deinterleaving law that varies over time for a given transmission mode.

12. A reception method implemented by a receiver device comprising a module for demultiplexing and demodulating symbols by $N_{FTT}$ orthogonal functions, wherein the method comprises the steps of:
demodulating an estimator modulated orthogonal symbol having its real portion equal to one and its imaginary portion equal to zero in order to estimate a transfer function of a transmission channel;
deinterleaving demodulated symbols by means of a deinterleaving law; and
calculating at determined instants the deinterleaving law that varies over time for a given transmission mode.

* * * * *